Sept. 14, 1937.　　　　G. OHBERG　　　　2,093,289
APPARATUS FOR CLEANING CEILINGS AND THE LIKE
Filed May 9, 1935

INVENTOR.
GUSTAV OHBERG
BY
ATTORNEY.

Patented Sept. 14, 1937

2,093,289

UNITED STATES PATENT OFFICE 2,093,289

APPARATUS FOR CLEANING CEILINGS AND THE LIKE

Gustav Ohberg, Brooklyn, N. Y.

Application May 9, 1935, Serial No. 20,583

2 Claims. (Cl. 51—180)

This invention relates to new and useful improvements in apparatus for cleaning ceilings, and the like, and it has for its specific object to provide a machine that will be very efficient in use, easy to operate, and which may be employed on any ceiling without regard to the height of the latter.

As additional advantages may be stated that the said machine is readily transportable, of a sturdy construction, and comparatively cheap to manufacture.

With the above and other objects in view, this invention consists of the novel features of construction, combination and arrangement of parts, hereinafter fully described, claimed and illustrated in the accompanying drawing forming part of this specification, and in which similar characters of references indicate corresponding parts in all views, and in which:

Figure 1 is a top plan view of my invention.

Figure 2 is a detail transverse sectional view on the line 2—2 of Figure 1; while

Figure 4 is a top plan view, partly in section, on the line 4—4 in Figure 3, showing particularly the pinion, ratchet and handle; while

Figure 6 is a detail transverse sectional view of the roller illustrating the hinge arrangement.

Figure 7 is a similar sectional view of the locking device; while

Figure 4:
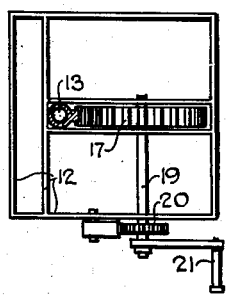
Figures 3, 8:
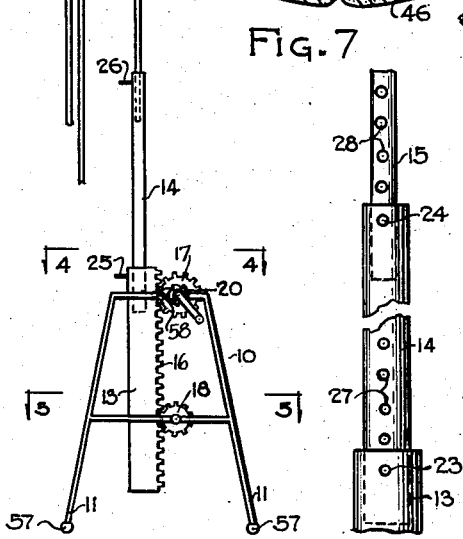
Figure 3 is a side elevational view of my cleaning device, ready for use.
Figure 8 is a detail elevational view, showing the arrangement of the three metal pipes.
Figure 5:
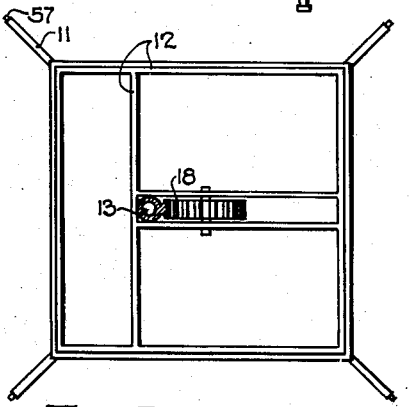
Figure 5 is a similar view on the line 5—5 of Figure 3, showing the idler pinion.

Referring more particularly to the drawing, 10 indicates a square stand, comprising four legs 11, and the frame-work 12, as shown especially in the Figures 4 and 5; three different lengths of pipes 13, 14 and 15, of sizes permitting each one to slide into the next adjoining one, and of which the lowest and the largest is provided with a rack 16 welded to the latter or otherwise securely fastened together therewith, are forming part of the said construction.

The said stand is also provided with a pinion 17 and an idler pinion 18, the gearing of said pinions corresponding to that of the rack 16. The shaft 19 of the pinion 17 extends beyond the frame-work, and secured to shaft 19 are a ratchet wheel 20 and a handle 21, thus permitting the operator of the machine to raise or lower the platform 22.

The two pipes 13 and 14 are furthermore provided with small holes 23 and 24, respectively, and small pins 25 and 26 to fit into the same, while in the pipes 14 and 15 there are rows of corresponding holes 27 and 28.

This arrangement permits of a quick, rough adjustment, whereupon subsequently the final and exact adjusting is obtained by use of the handle 21.

The upper end 29 of the pipe 15 is threaded and fits into a correspondingly threaded cap 30, which again is fastened to the platform, for instance, by means of a central screw 31. For further stabilization four brackets 32, secured to a collar 33, support the corners of the said platform.

On the platform is arranged a square box 34, and an electric motor 35, both held in place by screws, bolts, or in any other suitable manner.

While the box is of metal its upper edge 59 consists of rubber, flexible enough to acquire a desired light fit against the ceiling. In said box is the roller 36 consisting of a drum 37, rotating with a shaft 38 onto which on the outside of the box a pulley 39 is attached, said pulley being by means of a belting 40 connected to the motor.

Figures 1, 2:
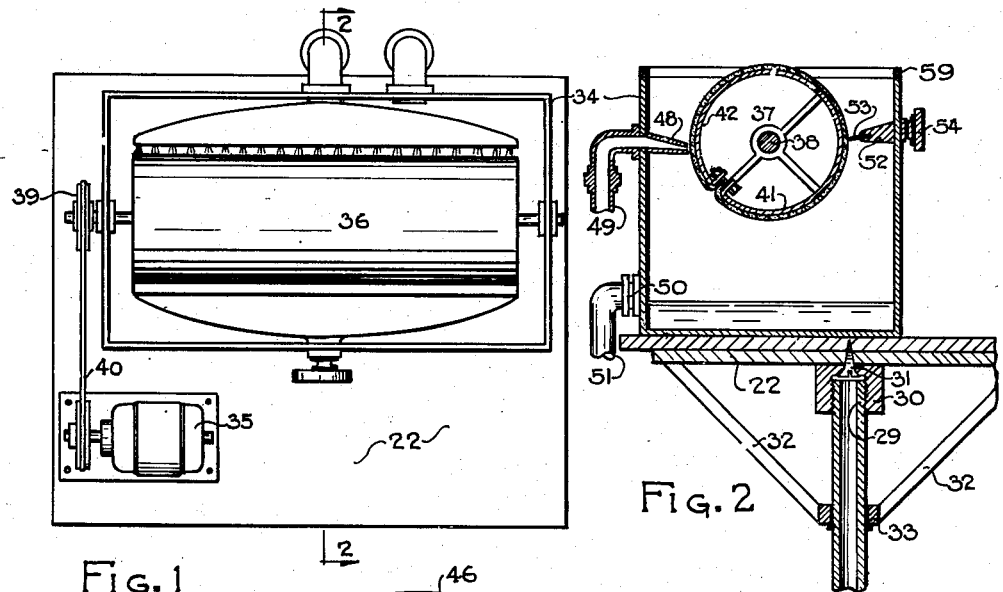
Figures 6, 7:
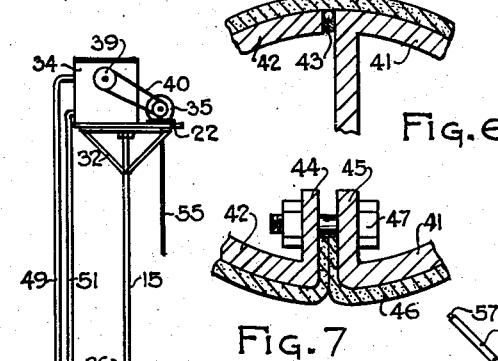

The drum consists of two parts 41 and 42, hinged together as indicated by the numeral 43 in Figure 6, while on the opposite side the ends of the drum are inwardly bent, forming the two flanges 44 and 45.

The ends of a sheet of sandpaper, or felt 46, which latter has been tightly applied to the surface of the drum, are bent into the slot formed by the two flanges, and the latter by means of a standard machine bolt, or a few of these, serve as a kind of locking device holding the paper or felt in place.

Fastened to the inside of the box and approximately as high as the axis of the drum is a water sprayer 48, which in turn by means of a rubber hose of a substantial length 49 is connected to a water faucet, where running water is obtainable. Approximatley 2 inches above the bottom of the box there is provided an outlet 50, the latter being connected by an additional hose 51 to a sink or lavatory.

The reason for having the outlet above the bottom of the box is to cause larger particles not dissolvable in water to remain in said box, thus preventing said particles from clogging up the hose.

Opposite the water-sprinkler and at about the same height, a scraper 52 with a rubber edge 53 is secured in place by means of a screw 54.

Electricity is supplied to the motor by means of an extension cord 55 connected to a convenient source.

When the rotating drum with the attached sandpaper or felt is firmly pressed up against the ceiling desired to be cleaned, it will quickly remove the dirt, old paint, etc.

The constant flow of water from the sprinkler will clean the surface of the drum of the removed particles, and the scraper will prevent splashing, which might be caused by the rotating drum.

Where running water is not available, both the overflow and the supply hose might be disconnected, and the openings capped.

Under these circumstances the box may be filled with water to cover approximately half of the drum, and, of course, the water will then occasionally have to be renewed.

The legs are provided with casters 57, and a standard ratchet-pawl 58 is arranged in connection with the ratchet wheel.

It is obvious that changes may be made in the form, construction and arrangement of the several parts, as shown, within the scope of the appended claims, without departing from the spirit of the invention, and I do not therefore wish to limit myself to the exact construction and arrangement shown and described herein.

What I claim as new, and desire to secure by Letters Patent of the United States, is:—

1. An apparatus for cleaning ceilings and the like, comprising an adjustable stand, a platform supported by the latter and having a threaded cap-portion integrally secured to its lower side, said adjustable stand consisting of three telescopic tube members, the upper one of said members, terminating in a threaded portion adapted for engagement with said platform by means of the cap-portion upon the latter, a collar arranged upon said upper tube member, and supporting brackets arranged between said collar and the corners upon the lower surface of the platform, a container mounted upon the latter, said container being at its upper end formed with a flexible rubber edge portion adapted to engage a ceiling upon adjustment of the stand, a drum arranged in said container, a scraper consisting of an outer metal part and an inner rubber section, a screw securing said metal part of the scraper to the wall of the container, said scraper being adapted to slightly contact the drum, during the turning of the latter, a water-sprayer arranged in the container and adapted to cooperate with the drum, and a water-outlet a short distance above the bottom of said container.

2. In an apparatus for cleaning ceilings and the like, a number of upright members telescopically arranged, means for adjusting the length of the latter, a platform mounted upon the upper one of said members, said upper member terminating in a threaded stud, and having a collar mounted upon its body intermediate its two ends, the platform being upon its lower surface provided with a cap adapted to engage said stud, supporting brackets disposed between the collar and the lower surface of the platform, a container mounted upon the latter, said container being at its upper end formed with a flexible rubber edge portion adapted to engage a ceiling upon adjustment of the telescopically arranged upright members, a drum turnable in the container, a scraper attached to the inner wall of the container, said scraper consisting of a metal part and a rubber part, the latter being adapted to engage said drum in operation, a screw for securing the metal part of the scraper to the inner wall of the container, a water-sprayer arranged in the latter and adapted to cooperate with the drum, and a water-outlet disposed in approximate nearness to the bottom of the container.

GUSTAV OHBERG.